(12) United States Patent
Sano et al.

(10) Patent No.: US 6,396,206 B1
(45) Date of Patent: May 28, 2002

(54) CATHODE RAY TUBE HAVING MULTIPLE SETS OF ORBITAL CORRECTION COILS

(75) Inventors: Yuuichi Sano; Masahiro Yokota, both of Fukaya; Hiroaki Ibuki, Kumagaya, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/497,728

(22) Filed: Feb. 4, 2000

(30) Foreign Application Priority Data

Feb. 5, 1999 (JP) .......................... 11-028528

(51) Int. Cl.[7] .................... H01J 31/00; H01J 29/70; H01J 29/74; H01F 7/00; H01H 1/00
(52) U.S. Cl. .................. 313/477 R; 313/431; 313/413; 313/433; 313/437; 313/440; 313/442; 335/210; 335/213
(58) Field of Search ................ 313/413, 407, 313/433, 461, 466, 440, 441, 442, 421, 426, 427, 428, 429, 430, 431, 477 R, 437; 335/210, 213, 296–299; 315/370, 399, 368.26; 345/13–14

(56) References Cited

U.S. PATENT DOCUMENTS 5,077,533 A  * 12/1991  Klingelhofer ............... 335/213
5,719,476 A  *  2/1998  Grote ..................... 313/440 X
5,811,922 A  *  9/1998  Yi ........................... 313/440
6,046,713 A  *  4/2000  Jamar ...................... 313/413 X

OTHER PUBLICATIONS

IDW'98 P413–416 "CRT4–2: The Philips Real flat CRT Design" Proceedings of The Fourth International Display Workshops.

* cited by examiner

Primary Examiner—Ashok Patel
Assistant Examiner—Mack Haynes
(74) Attorney, Agent, or Firm—Pillsbury Winthrop LLP

(57) ABSTRACT

An electron gun which emits three electron beams consisting of a center beam and paired side beams arranged in line in the horizontal axis is arranged in the neck of the vacuum envelope. A neck-side orbital correction coil unit for over-converging the side beams running toward the peripheral portion of a phosphor screen and a panel-side orbital correction coil unit for under-converging the side beams running toward the peripheral portion of the phosphor screen are provided between the cathode of the electron gun and the phosphor screen. The panel-side orbital correction coil unit has four orbital correction coils provided inside the magnetic core of a deflection yoke. Each orbital correction coil includes paired coil wires extending in the tube axis direction. One of the coil wires is positioned at an angle of 10 to 30° to the vertical axis, and the current flows from the neck side toward the panel through this coil wire. The other coil wires are positioned at an angle of 60 to 90° to the vertical axis, and the current flows from the panel side toward the neck through this coil.

5 Claims, 6 Drawing Sheets

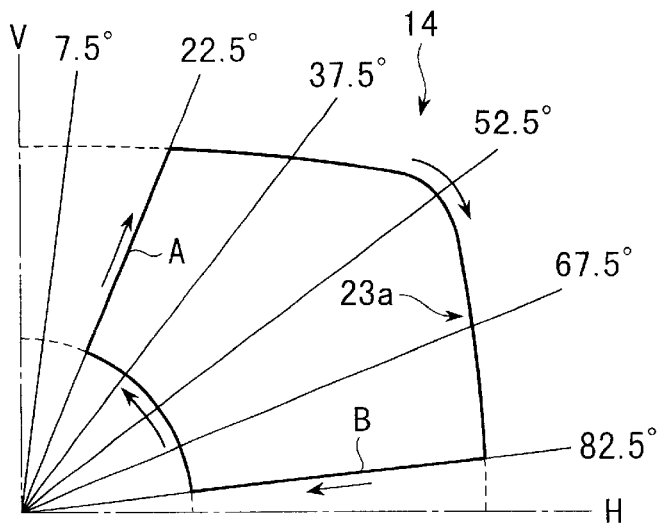
FIG. 8
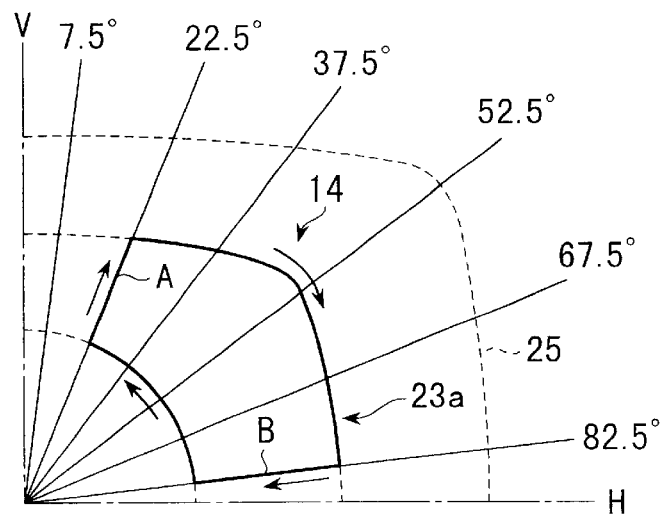
FIG. 9
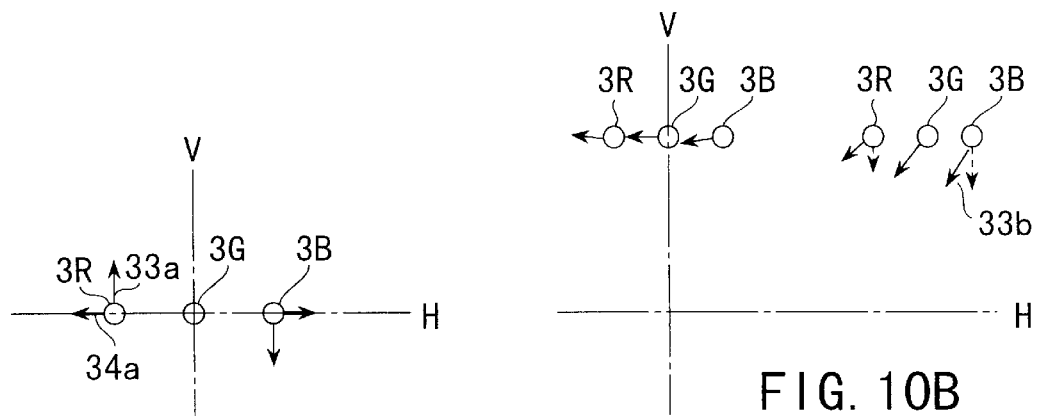
FIG. 10A
FIG. 10B

CATHODE RAY TUBE HAVING MULTIPLE SETS OF ORBITAL CORRECTION COILS

CROSS-REFERENCE TO RELATED APPLICATION

This application is based upon and claims the benefit of priority from the prior Japanese Patent Application No. 11-028528, filed Feb. 5, 1999, the entire contents of which are incorporated herein by reference.

BACKGROUND OF THE INVENTION

The present invention relates to a color cathode ray tube such as a TV, a monitor, or the like, and particularly to a cathode ray tube apparatus which realizes a flat screen using a press-molded mask for selecting colors.

In general, a cathode ray tube apparatus comprises a vacuum envelope which includes a panel having a substantially rectangular display portion, a funnel connected continuously to the panel, and a cylindrical neck connected continuously to the small diameter end of the funnel. A deflection yoke is installed thereon from the end portion of the neck on the funnel side to the small diameter portion of the funnel.

A phosphor screen having a dotted or striped three-color phosphor layer which radiates in blue, green, and red is formed on the inner surface of the panel. Also, a shadow mask (for selecting color) having a surface which faces the phosphor screen and has a number of electron beam passage apertures formed at a predetermined layout pitch is arranged to face the phosphor screen. Further, an electron gun which emits three electron beams is provided inside the neck.

In the cathode ray tube apparatus described above, the electron beams emitted from the electron gun are deflected in the horizontal and vertical directions by horizontal and vertical magnetic fields generated by the deflection yoke, so the phosphor screen is scanned horizontally and vertically through the shadow mask thereby displaying a color image.

At present, as a color cathode ray tube apparatus of this kind, a color cathode ray tube of self-convergence inline type is used widely. This apparatus adopts an electron gun of inline type which emits three-electron beams consisting of a center beam and a pair of side beams which are arranged in line and run on the same horizontal plane. The horizontal deflection magnetic field generated by the deflection yoke is arranged in a pin-cushion shape while the vertical deflection magnetic field is arranged in a barrel shape, and the three electron beams arranged in line are deflected by these horizontal and vertical deflection magnetic fields. In this manner, the three electron beams can be converged over the entire screen without requiring any special correction means.

In recent years, there has been a strong demand for flatness of the screen in this kind of color cathode ray tube. In order to achieve this flatness, it is necessary to flatten the panel. However, if the panel is flattened, the shadow mask must also be flattened. As a result, the following problem arises.

In general, in a color cathode ray tube apparatus, three electron beams are converged on the center of a phosphor screen mainly by a purity convergence magnet attached to the deflection yoke in the neck side. The three electron beams pass through the electron beam passage apertures of the shadow mask at a predetermined angle and respectively land on predetermined phosphor layers. To optimize landing margins thereof in relation to the phosphor layers, it is necessary to set optimally the distance between the inner surface of the panel and the shadow mask.

Where q is the distance in the tube-axis direction between the shadow mask and the inner surface of the panel, σ is the distance between the center beam 3G and each of the pair of side beams 3B and 3R on the inner surface of the panel, and Ph is the pitch of the landing position of the center beam 3G in the in-line direction of the three electron beams on the inner surface of the panel, σ and Ph must be substantially constant over the entire surface of the phosphor screen in order to attain uniformness of the screen resolution. Consequently, if the panel is flattened, the shadow mask must also be flattened so that q is substantially constant, in order to make σ and Ph substantially constant on the entire phosphor screen.

In general, however, the shadow mask is manufactured by shaping a shadow mask material, which has a flat thin-plate-like shape and electron beam passage apertures formed by photo-etching, into a predetermined curved surface. This shaping is carried out in a manner that the non-aperture portion of the mask material which surrounds a region where electron beam passage apertures are formed is clamped and fixed by a die and a Planck holder and the aperture-formed region is bulged by a punch and a knockout. Therefore, if the shadow mask is flattened and the amount of an extension caused by the bulging is reduced, sufficient plastic deformation cannot be obtained and the mask material therefore cannot be shaped into a predetermined curved surface. Also, the shaping strength of the shadow mask is deteriorated to cause deformation easily.

As a measure for solving this problem, between the phosphor screen and the cathode of the electron gun which emits three electron beams 3B, 3G, and 3R arranged in line to the phosphor screen, there are provided two orbital correction means by which the force for correcting the pair of side beams 3B and 3R toward the center beam 3G is changed between the center and the peripheral portion of the phosphor screen are provided. As a result of this, the virtual distance Sg between the center beam 3G and each of the side beams 3B and 3R in the in-line direction of the three electron beams between the center and the peripheral portion of the phosphor screen varies such that the virtual distance Sgc1 when the electron beams run toward the peripheral portion is smaller compared with the virtual distance Sgc0 when the beams run toward the center of the screen.

These two orbital correction means are arranged such that generated forces Fr0 and Ff0 are set to zero with respect to three electron beams 3B, 3G, and 3R running toward the center of the phosphor screen and the side beams 3B and 3R are over-converged by means of a force Fr1 generated by the neck-side orbital correction means with respect to three electron beams 3B, 3G, and 3R running toward the peripheral portion. Further, the side beams 3B and 3R are under-converged by means of a force Ff1 generated by the panel-side orbital correction means.

As a result of this, the virtual distance Sg at the cathode decreases from Sgc0 at the center of the phosphor screen to the Sgc1 at the periphery thereof, so that the distance q between the inner surface of the panel and the shadow mask in the tube-axis direction at the peripheral portion of the phosphor screen can be increased by Δq=q−q0 in relation to the distance q0 between the inner surface of the panel and the shadow mask in the tube-axis direction at the center of the phosphor screen.

However, if there are provided orbital correction means for over/under-converging the pair of side beams 3B and 3R in correspondence with the position of the phosphor screen, as described above, a problem arises in that the convergence characteristic of the three electron beams 3B, 3G, and 3R is deteriorated as the amount of the orbital correction increases.

SUMMARY

The present invention has been made in view of the above problem, and its object is to provide a color cathode ray tube apparatus which is capable of improving the convergence characteristic of three electron beams over the entire phosphor screen even if a flat panel is combined with a shadow mask shaped to have a curved surface which is hardly deteriorated in processability and shaping strength.

To achieve the above object, a color cathode ray tube apparatus according to the present invention comprises: a vacuum envelope including a substantially rectangular panel having first and second axes which pass through a tube axis and are perpendicular to each other, a funnel connected to the panel, and a neck connected to an end of a small diameter portion of the funnel. Additionally, the color cathode ray tube comprises a phosphor screen formed on an inner surface of the panel; a mask for selecting colors, the mask having a surface which faces the phosphor screen with a predetermined distance, and a number of electron beam passage apertures formed in the surface. The color cathode ray tube further comprises an electron gun arranged in the neck for emitting three electron beams toward the phosphor screen, the three electron beams including a center beam and a pair of side beams and being arranged in line with the first axis set as an in-line direction. Further, the color cathode ray tube comprises a deflection yoke installed on the small diameter portion of the funnel and the neck and having deflection coils for deflecting the three electron beans in directions of the first and second axes and a magnetic core provided outside the deflection coils. The color cathode ray tube also comprises neck-side orbital correction means arranged between a cathode of the electron gun and the phosphor screen, for relatively over-converging the pair of side beams running toward a peripheral portion of the phosphor screen in relation to the pair of side beams running toward a center of the phosphor screen. The color cathode ray tube additionally comprises panel-side orbital correction means arranged between the neck-side orbital correction means and the phosphor screen, for relatively under-converging the pair of side beams running toward the peripheral portion of the phosphor screen in relation to the pair of side beams running toward the center of the phosphor screen, wherein the panel-side orbital correction means includes looped orbital correction coils each wound a plurality of time and arranged at four positions inside the magnetic core, and a current supply circuit for supplying the orbital correction coils with a current which is supplied to the deflection coil for deflecting the three electron beams in the direction of the second axis. In a cross section perpendicular to the tube axis at a position near the phosphor screen, each of the orbital correction coils provided between the first and second axes includes first coil wires which have an angle of 10 to 30° with respect to the second axis and through which a current flows in a direction from a side of the neck toward the panel, and second coil wires which have an angle of 60 to 90° with respect to the second axis and through which a current flows in a direction from a side of the panel toward the neck.

In the cathode ray tube apparatus according to the present invention, the neck-side orbital correction means includes coils arranged on the neck side of the deflection yoke, and a current supply circuit for supplying the coils with a current synchronized with a line deflection frequency.

Also, according to the present invention, the neck-side orbital correction means includes component members forming a part of the electron gun, and a voltage supply circuit for supplying the component members with a voltage.

Further, another color cathode ray tube apparatus according to the present invention comprises: a vacuum envelope including a substantially rectangular panel having first and second axes which pass through a tube axis and are perpendicular to each other, a funnel connected to the panel, and a neck connected to an end of small diameter portion of the funnel. The color cathode ray tube also comprises a phosphor screen formed on an inner surface of the panel; a mask for selecting colors, the mask having a surface which faces the phosphor screen with a predetermined distance, and a number of electron beam passage apertures formed in the surface. Additionally, the color cathode ray tube comprises an electron gun arranged in the neck for emitting three electron beams toward the phosphor screen, the three electron beams including a center beam and a pair of side beams and being arranged in line with the first axis set as an in-line direction. The color cathode ray tube also comprises, a deflection yoke installed on the small diameter portion of the funnel and the neck and having deflection coils for deflecting the three electron beams in directions of the first and second axes and a magnetic core provided outside, the deflection coils. Further, the color cathode ray tube comprises neck-side orbital correction means arranged between a cathode of the electron gun and the phosphor screen, for relatively over-converging the pair of side beams running toward a peripheral portion of the phosphor screen in relation to the pair of side beams running toward a center of the phosphor screen; and panel-side orbital correction means arranged between the neck-side orbital correction means and the phosphor screen, for relatively under-converging the pair of side beams running toward the peripheral portion of the phosphor screen in relation to the pair of side beams running toward the center of the phosphor screen, such that a convergence error amount of the three electron beams on the phosphor screen caused by the neck-side orbital correction means is canceled and reduced to 1.5 mm or less. Additionally, the deflection coils have a wind distribution adjusted so as to compensate for a remaining portion of the convergence error amount.

According to the cathode ray tube apparatus constructed as described above, the convergence characteristics of the three electron beams can be improved to be excellent over the entire phosphor screen even if a flat screen is realized by providing two orbital correction means and by using a shadow mask having a large curvature relative to the flat panel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view for explaining the layout of looped orbital correction coils of the panel-side orbital correction coil unit, FIG. 9 is a view showing another layout example of looped orbital correction coils of the panel-side orbital correction coil unit, FIG. 10A is a view showing an effect of the magnetic field generated at a neck-side portion of the panel-side orbital correction coil unit, FIG. 10B is a view showing an effect of the magnetic field generated at a phosphor-screen-side portion of the panel-side orbital correction coil unit.

DETAILED DESCRIPTION OF THE INVENTION

In the following, a color cathode ray tube apparatus according to an embodiment of the present invention will be specifically explained with reference to the accompanying drawings.

Figure 1:
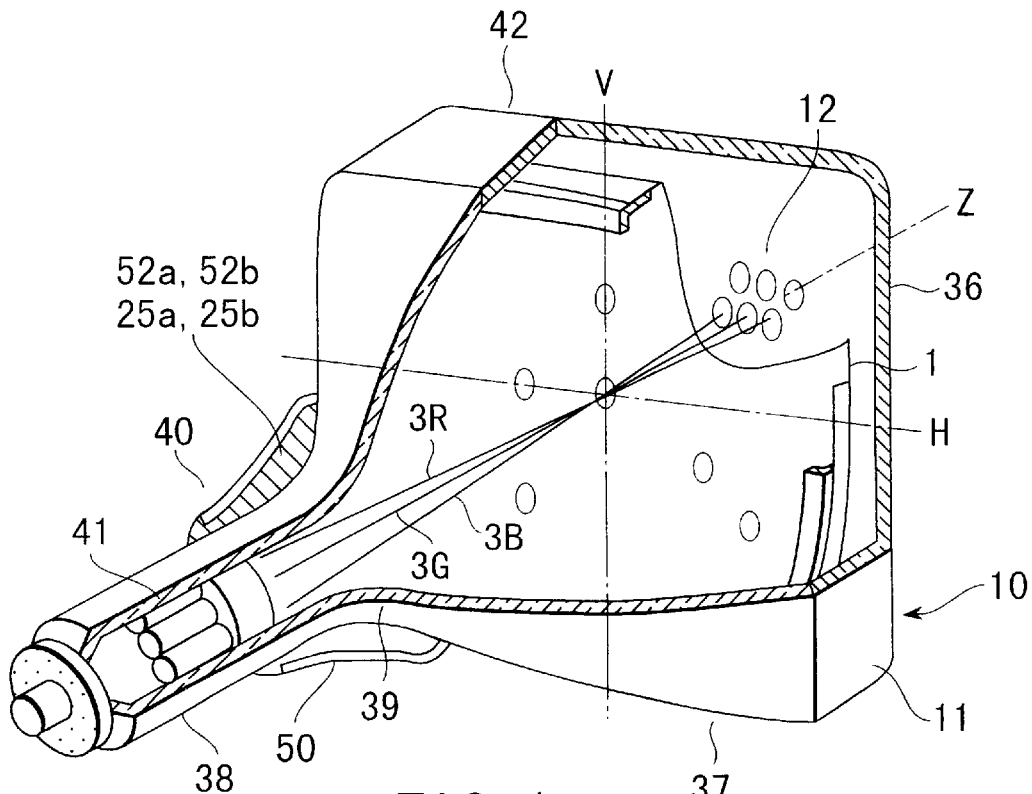
FIG. 1 is a perspective view showing a color cathode ray tube apparatus according to an embodiment of the present invention with a part of the apparatus cut away.

As shown in FIG. 1, a color cathode ray tube apparatus comprises a vacuum envelope 10 which includes a substantially rectangular panel 36 having a horizontal axis H and a vertical axis V, a funnel 37 connected continuously to a skirt portion of the panel 36, and a cylindrical neck 38 connected continuously to the end of the small diameter portion of the funnel. A deflection yoke 40 is installed over an area from the funnel 37 side of the neck 38 to the outside of the small diameter portion 39 of the funnel 37. The deflection yoke 40 has horizontal deflection coil 52a, 52b and vertical deflection coils 25a and 25b which are wound around the inside of a magnetic core 50.

A phosphor screen 12 having dotted shaped three-color phosphor layers which emit light in blue, green, and red is formed on the inner surface of the panel 36. Also, a shadow mask 1 (a color selection mask) is arranged to face the phosphor screen 12 with a predetermined distance. A number of electron beam passage apertures are formed at a predetermined layout pitch in the surface of the shadow mask 1 which faces the phosphor screen 12. Inside the neck 38 is arranged an electron gun 41 for emitting three electron beams 3B, 3G, and 3R, i.e., a center beam 3G and a pair of side beams 3B and 3R, arranged in line in the horizontal axis (H-axis) direction.

In the color cathode ray tube apparatus, the electron beams 3R, 3G, and 3B emitted from the electron gun 41 are deflected through the horizontal and vertical deflection magnetic fields generated by the horizontal and vertical deflection coils 52a, 52b, and 25a, 25b of the deflection yoke 40 and scan the phosphor screen 12 horizontally and vertically through the shadow mask 1 thereby displaying a color image.

Figure 2:
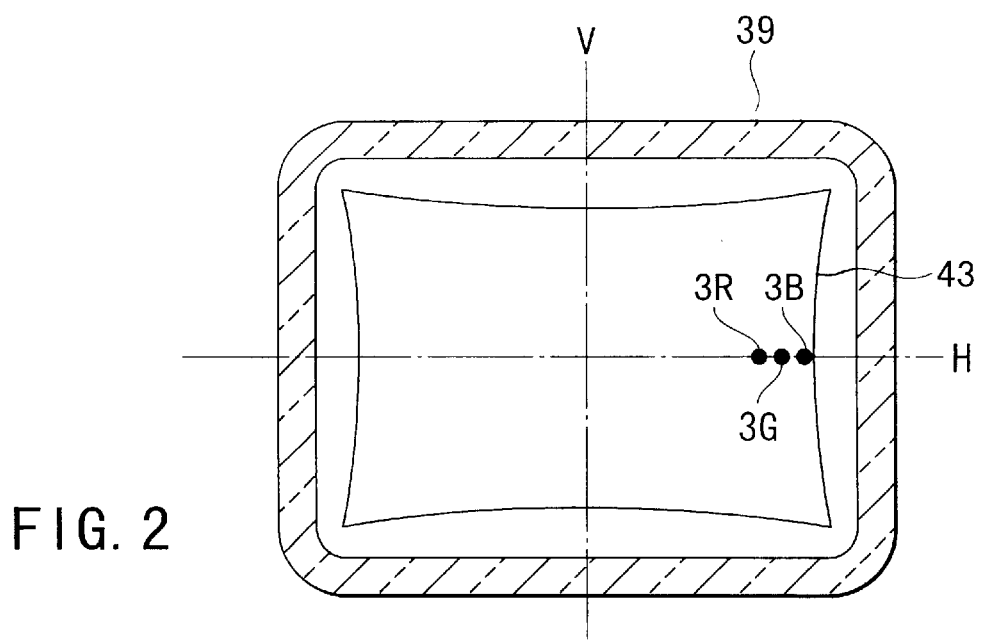
FIG. 2 is a cross-sectional view showing a cross-sectional shape perpendicular to the tube axis of a small diameter portion of the funnel of the color cathode ray tube apparatus.

In the color cathode ray tube apparatus, the panel 36 is formed such that the outer surface of the display portion 42 is flat and the inner surface thereof is formed as a curved surface having a very small curvature. The small diameter portion 39 of the funnel 37, on which the deflection yoke 40 is mounted, is formed in a substantially pyramidal shape such that its cross-section perpendicular to the tube axis Z is formed to be substantially rectangular, as shown in FIG. 2, in correspondence with the outer periphery of a substantially rectangular electron beam passing area 43.

This color cathode ray tube apparatus is provided with two orbital correction means for changing the orbits of the pair of side beams 3B and 3R in the in-line direction of the three electron beams. These two orbital correction means include an orbital correction coil unit 13 on the neck side and an orbital correction coil unit 14 on the panel side.

The neck-side orbital correction coil unit 13 has two orbital correction coils 22a and 22b which are wound respectively around two U-shaped magnetic cores 21a and 21b of coma-free coils 20a and 20b arranged on the neck side of the deflection yoke 40. Also, the panel-side orbital correction coil unit 14 has four looped orbital correction coils 23a, 23b, 23c, and 23d wound on the inside of the magnetic core 50 of the deflection yoke 40. The orbital correction coils 23a, 23b, 23c, and 23d are arranged at four positions divided by the vertical axis V and the horizontal axis H, and each of these coils has a pair of linear coil wires substantially extending in the tube axis Z direction, and a pair of coil wires extending in the circumferential direction about the tube axis Z as a center.

Figure 4:
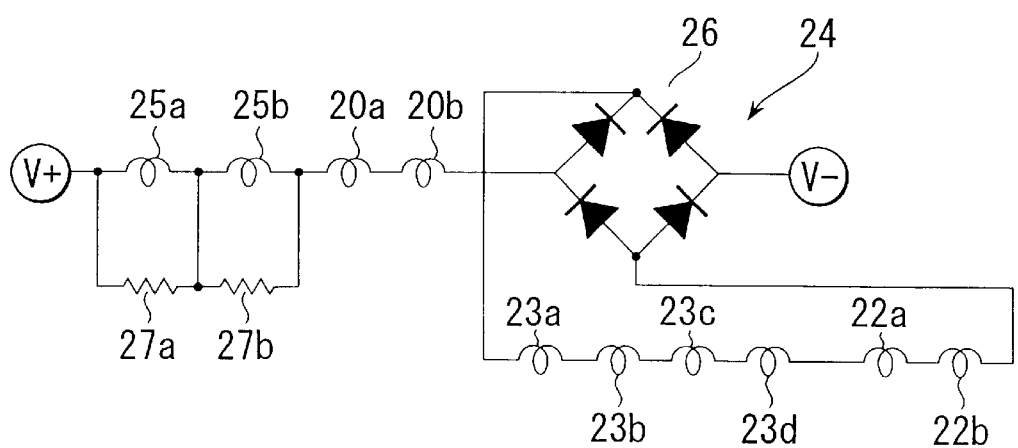
FIG. 4 is a diagram showing a current supply circuit for the orbital correction coil units on the neck side and the panel side.

As shown in FIG. 4, the orbital correction coil units 13 and 14 are provided with a current supply circuit 24 which supplies the orbital correction coils 22a, 22b, 23a, 23b, 23c, and 23d with a current synchronized with the line deflection frequency.

Each of the orbital correction coils 22a, 22b, 23a, 23b, 23c, and 23d is connected to a diode rectifier circuit 26, and this diode rectifier circuit 26 is connected to the vertical deflection coils 25a and 25b of the deflection yoke 40 through the coma-free coils 20a and 20b. Note that reference symbols 27a and 27b denote damping resistors for bypassing a high-frequency current applied to the vertical deflection coils 25a and 25b.

Further, when three electron beams 3B, 3G, and 3R are deflected in the horizontal axis H direction, no current is supplied to the orbital correction coils 22a, 22b, 23a, 23b, 23c, and 23d. When the three electron beams 3B, 3G, and 3R are deflected in the vertical direction of the phosphor screen 12, a current which flows in the same direction is supplied to each orbital correction coil.

The orbital correction coils 22a and 22b of the neck-side orbital correction coil unit 13 are wound so as to generate a four-pole magnetic field by the supply of the current as described above, thereby to over-converge the side beams 3B and 3R deflected in the vertical direction of the phosphor screen 12. Meanwhile, the orbital correction coils 23a, 23b, 23c, and 23d of the panel-side orbital correction coil unit 14 are wound like a loop so as to generate a four-pole magnetic field which is opposite to that generated by the neck-side orbital correction coil unit 13, thereby to under-converge the side beams 3B and 3R deflected in the vertical direction of the phosphor screen 12.

Figure 5:
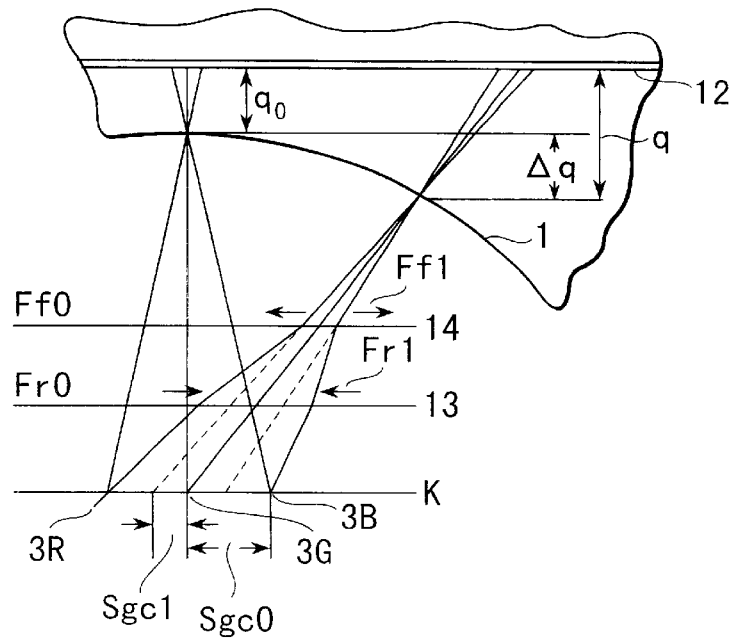
FIG. 5 is a view showing a state where the orbits of the electron beams running toward the peripheral portion of the phosphor screen are corrected by the orbital correction coil units on the neck side and the panel side.

That is, as shown in FIG. 5, by providing the neck-side and panel-side orbital correction coil units 13 and 14, the virtual distance Sg between the center beams 3G and each of the side beams 3B and 3R is controlled such that the distance Sgc1 when the beams run toward the peripheral portion of the phosphor screen 12 is smaller in relation to the distance Sgc0 when the beams run toward the center thereof.

These two orbital correction coil units 13 and 14 sets generated forces Fr0 and Ff0 to zero with respect to three electron beams 3B, 3G, and 3R running toward the center of the phosphor screen 12, while the coil units 13 and 14 over-converge the side beams 3B and 3R by the force Fr1 generated by the neck-side orbital correction coil unit 13 and under-converge the side beams 3B and 3R by the force Ff1 generated by the panel-side orbital correction coil unit 14, with respect to the three electron beams running toward a peripheral portion of the phosphor screen.

In this manner, the virtual distance Sg in the cathode K of the electron gun 41 can be decreased from Sgc0 at the center of the phosphor screen to Sgc1 at the periphery thereof, so that the distance q between the inner surface of the panel 36 and the shadow mask 1 in the tube-axis direction at the peripheral portion of the phosphor screen 12 can be increased by Δq=q−q0 in relation to the distance q0 between the inner surface of the panel and the shadow mask at the center of the phosphor screen.

However, if there are provided the orbital correction coil units which over/under-converge the pair of side beams in accordance with the position on the phosphor screen 12, a problem occurs in that the convergence characteristic of the three electron beams 3B, 3G, and 3R is deteriorated more as the orbital correction amount increases.

The present embodiment is hence achieved as a result of analyzing the problem in deterioration of the convergence characteristic.

Figure 3:
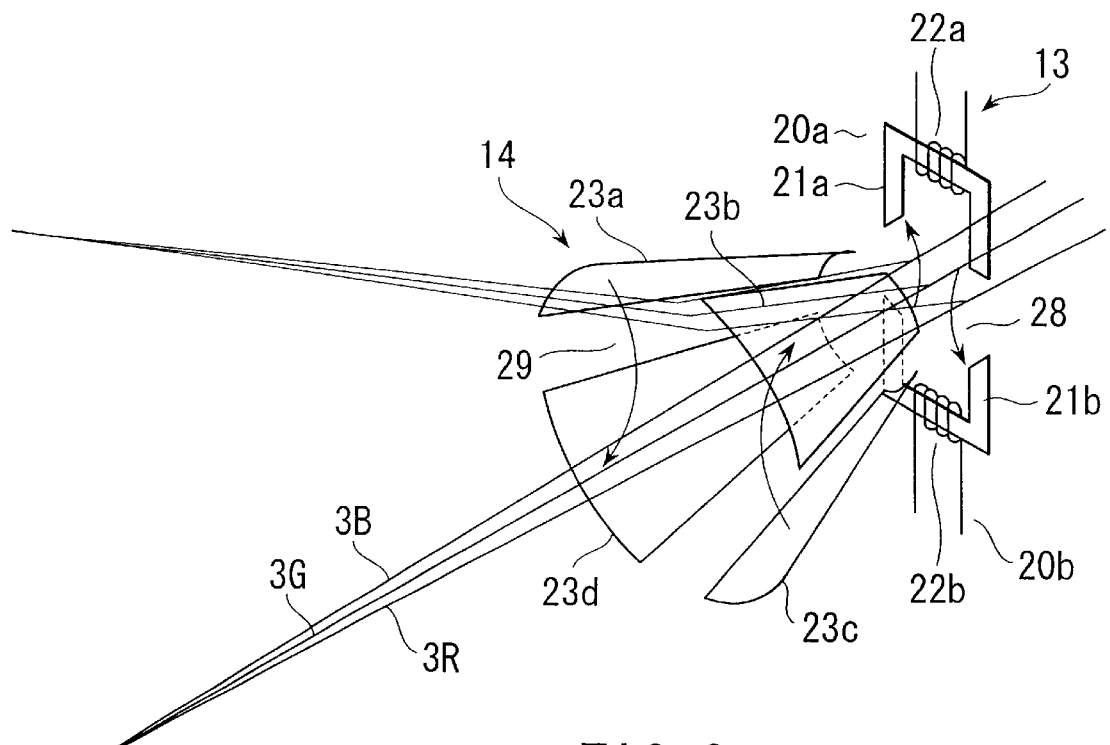
FIG. 3 is a perspective view showing orbital correction coil units on the neck side and the panel side, which are provided on the deflection yoke of the color cathode ray tube apparatus.

More specifically, as shown in FIG. 3, the two orbital correction coils 22a and 22b of the neck-side orbital correction coil unit 13 are wound such that the polarities of magnetic poles formed at the top end portions of the magnetic cores 21a and 21b are inverted at the adjacent inlays during electric conductance, and the four-pole magnetic component 28 thereby generated over-converges the pair of side beams 3B and 3R. In contrast, four looped orbital correction coils 23a, 23b, 23c, and 23d of the panel-side orbital correction coil unit 14 are wound such that the directions of the magnetic fields generated between each adjacent pair of orbital correction coils 23a, 23b, 23c, and 23d are inverted from each other during electric conductance, and the four-pole magnetic component 29 thereby generated under-converges the pair of side beams 3B and 3R.

If these orbital correction coil units 13 and 14 are provided, the virtual Sg becomes small at the upper and lower ends of the phosphor screen 12 as explained with reference to FIG. 5, so that the distance q can be increased.

Figures 6A, 6B:
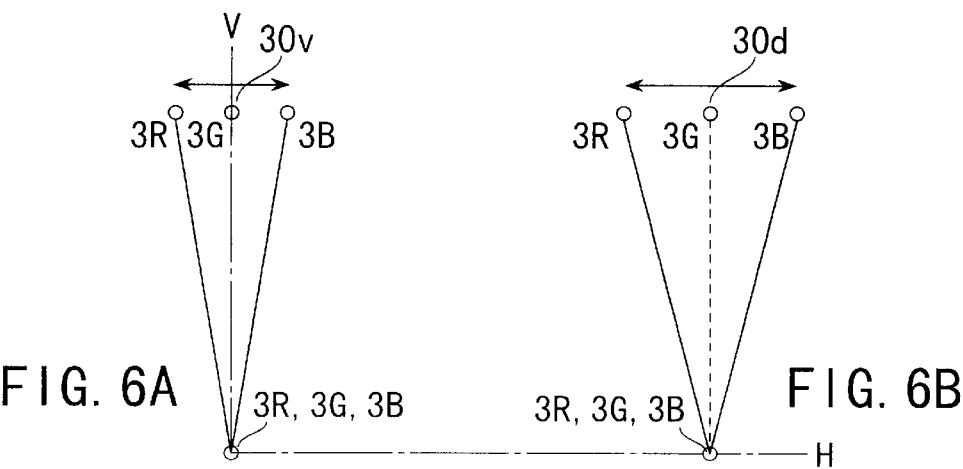
FIG. 6A is a view showing the convergence characteristic at the end of the vertical axis of the phosphor screen where only the neck-side orbital correction coil unit is operated.
FIG. 6B is a view showing the convergence characteristic at the end of the diagonal axis of the phosphor screen where only the neck-side orbital correction coil unit is operated.

However, if only the neck-side orbital correction coil unit 13 is operated, the convergence characteristic of the pair of side beams 3B and 3R is such that the side beams 3B and 3R are over-converged at the vertical axis (V-axis) end 30v while the side beams 3B and 3R at the diagonal axis end 30d are over-converged to be 1.5 times or more higher than at the vertical axis end 30v, as shown in FIGS. 6A and 6B. In this case, in the neck side where the neck-side orbital correction coil unit 13 is provided, the deflection by the horizontal and vertical deflection coils of the deflection yoke 40 is very small, so that the passing positions of the electron beams 3B, 3G, and 3R running toward the vertical axis end 30v of the phosphor screen 12 are substantially equal to the positions of the beams running toward the diagonal axis end 30d. However, since the running length from the neck-side orbital correction coil unit 13 to the diagonal axis end 30d is longer than the running length therefrom to the vertical axis end 30v, the over-convergence amount of the diagonal axis end 30d becomes large.

Figures 7A, 7B:
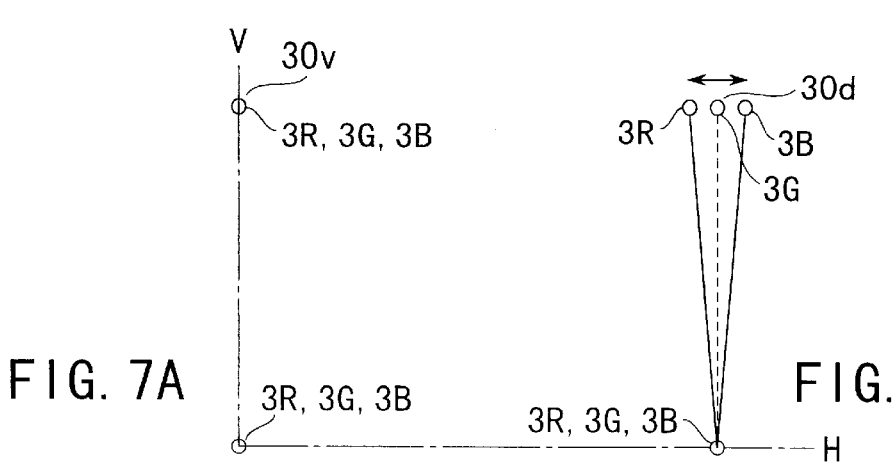
FIG. 7A is a view showing the convergence characteristic at the end of the vertical axis of the phosphor screen where the neck-side and panel-side orbital correction coil units are operated.
FIG. 7B is a view showing the convergence characteristic at the end of the diagonal axis of the phosphor screen where the neck-side and panel-side orbital correction coil units are operated.

With respect to this operation of the orbital correction coil unit 13 in the neck side, if the panel-side orbital correction coil unit 14 is operated and the pair of side beams 3B and 3R are under-converged so that the electron beams 3B, 3G, and 3R are matched at the vertical axis end 30v of the phosphor screen 12, as shown in FIGS. 7A and 7B, there arises a problem in that over-convergence at the diagonal axis end 30d cannot be corrected enough.

No specific structure of an orbital correction coil unit which can solve this problem of the convergence characteristic has been revealed by the prior art techniques. Hence, the present inventors have discussed the details of the structure of the panel-side orbital correction coil unit 14 and clarified the coil distribution that can improve the convergence characteristic.

The layout of the orbital correction coils 23a, 23b, 23c, and 23d of the panel-side orbital correction coil unit 14 will be explained now with respect to the orbital correction coil 23a as a representative example thereof. Suppose a case that on a cross-section perpendicular to the tube axis Z, the orbital correction coil 23a is positioned at the first inlay on the horizontal axis H and the vertical axis V as its coordinate axes, when viewed in the direction from the neck 38 side toward the phosphor screen 12, as shown in FIG. 8, and the coil wires A and B of the orbital correction coil 23a extending along the generator of the funnel 37, or in the tube-axis direction, are provided at any two positions of the angles of 7.5°, 22.5°, 37.5°, 52.5°, 67.5°, and 82.5° to the vertical axis V. Note that this orbital correction coil 23a is arranged at a position substantially equal to the vertical deflection coil and the length thereof in the tube axis direction is substantially equal to the length of the vertical deflection coil in the tube axis direction.

The following Table 1 shows results obtained where the combination of the layout positions (angles) of the orbital correction coil 23a of the panel-side orbital correction coil unit 14 are varied in fifteen ways in a color cathode ray tube apparatus in which the screen has an aspect ratio of 4:3, the phosphor screen 12 has a diagonal axis diameter of 46 cm, the deflection angle is 90°, and the deflection yoke has a substantially rectangular cross-section. Another orbital correction coils 23b, 23c, and 23d are arranged in symmetrical about the vertical and horizontal axes H and V.

TABLE 1

| | Panel-side Orbital correction coil unit | | | | | |
|---|---|---|---|---|---|---|
| | Coil | Open | | Convergence (mm) | | |
| | Position | Angle | Winds | Yb | PQh | PQy |
| No.1 | 7.5–82.5° | 75° | 17 | −0.02 | 7.51 | −1.71 |
| No.2 | 7.5–67.5° | 60° | 18 | 0.22 | 7.48 | −3.31 |
| No.3 | 7.5–52.5° | 45° | 20 | −0.02 | 8.76 | −6.67 |
| No.4 | 7.5–37.5° | 30° | 26 | −0.34 | 15.14 | −6.90 |
| No.5 | 7.5–22.5° | 15° | 41 | 0.13 | 17.02 | −3.09 |
| No.6 | 22.5–82.5° | 60° | 23 | 0.09 | −0.46 | −0.40 |
| No.7 | 22.5–67.5° | 45° | 24 | 0.09 | −1.48 | −2.72 |
| No.8 | 22.5–52.5° | 30° | 29 | 0.09 | −0.39 | −7.87 |
| No.9 | 22.5–37.5° | 15° | 40 | 0.11 | 8.74 | −8.88 |
| No.10 | 37.5–82.5° | 45° | 35 | −0.09 | −12.92 | 11.57 |
| No.11 | 37.5–67.5° | 30° | 38 | 0.09 | −15.60 | 8.23 |
| No.12 | 37.5–52.5° | 15° | 51 | −0.52 | −17.43 | −1.61 |
| No.13 | 52.5–82.5° | 30° | 52 | 0.17 | −0.81 | 23.42 |
| No.14 | 52.5–67.5° | 15° | 62 | 0.44 | −4.21 | 17.48 |
| No.15 | 67.5–82.5° | 15° | 78 | −0.06 | 4.32 | 11.54 |

In the above Table 1, the layout position of the orbital correction coil 23a, e.g., 22.5–82.5° in the column at No. 6 indicates a case where the coil wires A and B are respectively arranged on the lines at 22.5° and 82.5° shown in FIG. 8. Also, Yh indicates the difference between the side beams in the lateral direction (in the in-line direction of the three electron beams) at the end of the vertical axis V of the phosphor screen. PQh indicates the difference between the side beams in the lateral direction at the diagonal axis end. PQv indicates the difference between the side beams in the longitudinal direction at the diagonal axis end. In the Table 1, the situation in which the blue beam 3B is positioned outside in relation to the red beam 3R at the first inlay is considered as being plus. Also, the number of winds of each orbital correction coil of Nos. 1 to 15 shown in the Table 1 is adjusted such that Yh is equal, and PQh and PQv are compared under this condition.

As indicated at No. 6 in the table 1, if the coil wires A and B of the orbital correction coil 23a are respectively situated on the lines at angles 22.5° and 82.5°, convergences of the electron beams at the ends of the vertical axis V and the diagonal axis can be arranged to be excellent. Although it is apparent that the convergence error at the diagonal axis end should be as small as possible, the convergence error can be improved relatively easily by adjusting the distribution of winds of the horizontal and vertical deflection coils of the deflection yoke, if the amount of the convergence error is substantially within ±1.5 mm.

Taken into consideration the above, coil layout positions at which both of PQh and PQv are substantially within ±1.5 mm are obtained.

(a) Where the position of the coil wires A in the side of the vertical axis V is set to 18° and the coil wires position in the side of the horizontal axis H is set to 82.5°, PQh=approx. +1.50 mm
PQv=approx. −0.72 mm are obtained. If the position of the coil wires A is set to be smaller than 18°, the result changes so as to satisfy PQh>+1.50 mm (b) Where the position of the coil wires A in the side of the vertical axis V is set to 24° and the position of the coil wires B in the side of the horizontal axis H is set to 82.5°, PQh=approx. −1.50 mm
PQv=approx. +0.60 mm are obtained. If the position of the coil wires A is set to be larger than 24°, the result changes so as to satisfy PQh<−1.50 mm (c) Where the position of the coil wires A is set to 22.50 and the position of the coil wires B is set to 75°, PQh=approx. −0.94 mm
PQv=approx. −1.50 mm are obtained. If the position of the coil wires B in the horizontal axis side is set to be smaller than 75°, the result changes so as to satisfy PQv<−1.50 mm From the above, PQh and PQv can both be set within ±1.5 mm by setting the position of the coil wires A in the vertical axis V side to 18 to 24° and the position of the coil wires B in the horizontal axis H side to 75 to 90°. By adjusting the distributions of winds of the horizontal and vertical deflection coils of the deflection yoke 40, the convergence errors of the electron beams can be improved over the entire phosphor screen 12.

Next, the following Table 2 shows convergences (Yh, PQh, and PQv) obtained where the combination of the layout positions of the orbital correction coil 23a of the orbital correction coil unit 14 in the panel side are varied in fifteen ways in a color cathode ray tube apparatus in which the screen has an aspect ratio of 16:9, the phosphor screen 12 has a diagonal axis diameter of 86 cm, the deflection angle is 106°, and the outer diameter of the neck is 32.5 mm.

TABLE 2

| | Panel-side Orbital correction coil unit | | | | | |
|---|---|---|---|---|---|---|
| | Coil | Open | | Convergence (mm) | | |
| | Position | Angle | Winds | Yh | PQh | PQy |
| No.1 | 7.5–82.5° | 75° | 14 | −0.01 | 11.81 | −1.27 |
| No.2 | 7.5–67.5° | 60° | 15 | −0.11 | 10.93 | −3.38 |
| No.3 | 7.5–52.5° | 45° | 18 | −0.04 | 14.81 | −7.32 |
| No.4 | 7.5–37.5° | 30° | 24 | 0.08 | 25.78 | −6.87 |

TABLE 2-continued

| | Panel-side Orbital correction coil unit | | | Convergence (mm) | | |
|---|---|---|---|---|---|---|
| Coil Position | Open Angle | Winds | Yh | PQh | PQy | |
| No.5 | 7.5–22.5° | 15° | 50 | 0.15 | 32.17 | −3.45 |
| No.6 | 22.5–82.5° | 60° | 20 | −0.16 | 2.10 | −0.13 |
| No.7 | 22.5–67.5° | 45° | 22 | −0.07 | 0.27 | −3.08 |
| No.8 | 22.5–52.5° | 30° | 27 | 0.00 | 3.76 | −9.55 |
| No.9 | 22.5–37.5° | 15° | 47 | 0.04 | 19.29 | −10.25 |
| No.10 | 37.5–82.5° | 45° | 34 | −0.18 | −7.99 | 5.82 |
| No.11 | 37.5–67.5° | 30° | 41 | −0.26 | −19.55 | 7.90 |
| No.12 | 37.5–52.5° | 15° | 66 | −0.03 | −28.21 | −6.53 |
| No.13 | 52.5–82.5° | 30° | 69 | 0.17 | 4.13 | 39.27 |
| No.14 | 52.5–67.5° | 15° | 102 | −0.10 | −10.74 | 41.28 |
| No.15 | 67.5–82.5° | 15° | 225 | 0.00 | 37.37 | 45.71 |

As shown in No. 6, 7, and 10 in the table 2, if the coil wires A in the vertical axis V side is set to 22.5 to 37.5° and the coil wires B in the horizontal axis H side is set to 67.5 to 82.5°, convergences at the ends of the vertical axis and the diagonal axis of the phosphor screen 12 can be improved to be excellent.

(a) Where the position of the coil wires A is set to 23° and the position of the coil wires B is set to 82.5°, PQh=approx. +1.50 mm
PQv=approx. −0.22 mm are obtained. If the position of the coil wires A in the vertical axis V side is set to be smaller than 23°, the result changes so as to satisfy PQh>+1.50 mm (b) Where the position of the coil wires A is set to 27° and the position of the coil wires B is set to 82.5°, PQh=approx. −0.66 mm
PQv=approx. +1.50 mm are obtained. If the position of the coil wires A in the vertical axis V side is set to be greater than 27°, the result changes so as to satisfy PQv>+1.50 mm (c) Where the position of the coil wires A is set to 22.5° and the position of the coil wires B is set to 75°, PQh=approx. +1.25 mm
PQv=approx. −1.50 mm are obtained. If the position of the coil wires B in the horizontal H axis side is set to be smaller than 75°, the result changes so as to satisfy PQv<−1.50 mm (d) Where the position of the coil wires A is set to 22.5° and the position of the coil wires B is set to 78°, PQh=approx. +1.55 mm
PQv=approx. −1.09 mm are obtained. If the position of the coil wires B in the horizontal H axis side is set to be greater than 78°, the result changes so as to satisfy PQh>+1.50 mm From the above, PQh and PQv can both be set within ±1.5 mm or less by setting the position of the coil wires A in the vertical axis V side to 23 to 27° and the position of the coil wires B in the horizontal axis H side to 75 to 78°. By adjusting the distributions of winds of the horizontal and vertical deflection coils of the deflection yoke 40, the convergence errors of the electron beams can be improved over the entire phosphor screen 12.

Also, the following Table 3 shows convergences obtained where the length of the orbital correction coil 23a of the panel-side orbital correction coil unit 14 in the tube axis direction is set to about ½ of the length of the vertical deflection coils 25a and 25b in the tube axis direction as shown in FIG. 9, in a color cathode ray tube apparatus in which the screen has an aspect ratio of 4:3, the phosphor screen has a diagonal axis diameter of 46 cm, and the outer diameter of the neck is 29.1 mm.

TABLE 3

| | Panel-side Orbital correction coil unit | | | Convergence (mm) | | |
|---|---|---|---|---|---|---|
| Coil Position | Open Angle | Winds | Yh | PQh | PQy | |
| No.1 | 7.5–82.5° | 75° | 43 | −0.08 | 2.12 | −0.73 |
| No.2 | 7.5–67.5° | 60° | 45 | −0.07 | 3.06 | −2.14 |
| No.3 | 7.5–52.5° | 45° | 52 | 0.00 | 5.22 | −4.10 |
| No.4 | 7.5–37.5° | 30° | 69 | −0.18 | 7.47 | −5.33 |
| No.5 | 7.5–22.5° | 15° | 108 | −0.09 | 6.64 | −4.16 |
| No.6 | 22.5–82.5° | 60° | 49 | 0.11 | −0.18 | 0.85 |
| No.7 | 22.5–67.5° | 45° | 53 | −0.12 | 0.25 | −0.77 |
| No.8 | 22.5–52.5° | 30° | 63 | 0.11 | 2.70 | −3.02 |
| No.9 | 22.5–37.5° | 15° | 89 | −0.02 | 4.56 | −4.21 |
| No.10 | 37.5–82.5° | 45° | 64 | 0.16 | −3.47 | 4.12 |
| No.11 | 37.5–67.5° | 30° | 72 | −0.01 | −3.22 | 2.18 |
| No.12 | 37.5–52.5° | 15° | 92 | 0.06 | −1.03 | −0.73 |
| No.13 | 52.5–82.5° | 30° | 92 | −0.24 | −4.90 | 6.94 |
| No.14 | 52.5–67.5° | 15° | 108 | −0.12 | −4.01 | 4.40 |
| No.15 | 67.5–82.5° | 15° | 129 | 0.03 | −1.43 | 5.07 |

As shown in No. 1, 6, and 7 in the table 3, if the coil wires A in the vertical axis V side is set to 7.5 to 22.5° and the coil wires in the horizontal axis H side is set to 67.5 to 82.5°, convergences at the ends of the vertical axis and the diagonal axis of the phosphor screen 12 can be improved to be excellent.

(a) Where the position of the coil wires A is set to 11° and the position of the coil wires B is set to 82.5°, PQh=approx. +1.50 mm
PQv=approx. −0.30 mm are obtained. If the position of the coil wires A in the vertical axis V side is set to be smaller than 11°, the result changes so as to satisfy PQh>+1.50 mm (b) Where the position of the coil wires A is set to 30° and the position of the coil wires B is set to 67.5°, PQh=approx. −1.50 mm
PQv=approx. +0.72 mm are obtained. If the position of the coil wires A in the vertical axis V side is set to be greater than 30°, the result changes so as to satisfy PQh<−1.50 mm (c) Where the position of the coil wires A is set to 22.5° and the position of the coil wires B is set to 62°, PQh=approx. +1.04 mm
PQv=approx. −1.50 mm are obtained. If the position of the coil wires B in the horizontal axis H side is set to be smaller than 62°, the result changes so as to satisfy PQv<−1.50 mm From the above, PQh and PQv can both be set to +1.5 mm or less by setting the position of the coil wires A in the vertical axis V side to 11 to 30° and the position of the coil wires B in the horizontal axis H side to 62 to 90°. By adjusting the distributions of winds of the horizontal and vertical deflection coils of the deflection yoke 40, the convergence errors of the electron beams can be improved over the entire phosphor screen 12.

From the results shown in the above Tables 1 to 3, the following is found as to the panel-side orbital correction coil unit 14. If the length of the coil wires A and B of each orbital correction coil in the tube axis direction is long, the degree of freedom is small in optimizing the convergence error amount. By shortening the length (in the tube axis direction) in the direction toward the neck side, as shown in FIG. 9, the convergence error amount is reduced and the degree of freedom is increased with respect to the coil specifications of the panel-side orbital correction coil unit 14.

However, if the length of the coil wires in the tube axis direction is shortened, the sensitivity is deteriorated, and therefore, the number of winds of the coil must be increased. Also, the substantial distance between the neck-side orbital correction coil unit 13 and the panel-side correction magnetic circuit 14 is shortened thereby making it difficult to increase Δq. From these reasons, if the orbital correction coil of the panel-side orbital correction coil unit is looped, it is not preferable to set the length of the coil wires in the tube axis direction to ½ of the length of the vertical deflection coil in the tube axis direction.

Accordingly, each of the looped four-pole magnetic field generation coils of the panel-side orbital correction coil unit 14 does not have any relationship with the aspect ratio of the phosphor screen, the size of the phosphor screen, the deflection angle, or the neck diameter, but may be provided such that the layout position of the major portion of the coil wires A in the vertical axis V side is substantially 10 to 30° and the layout position of the major portion of the coil wires B in the horizontal axis H side is substantially 60 to 90°.

In case where the panel-side orbital correction coil unit 14 is constructed so as to match the convergences of the electron beams as described above, the magnetic fields generated by the panel-side orbital correction coil unit 14 which three electron beams running toward the ends of the vertical axis and the diagonal axis of the phosphor screen 12 pass are as shown in FIGS. 10A (neck-side) and 10B (panel-side). That is, in the portion of the panel-side orbital correction coil unit 14 in the neck side, the deflection amount of the electron beams owing to the horizontal and vertical deflection coils of the deflection yoke 40 is small as shown in FIG. 10A, there is not a large difference between the passing positions of the three electron beams running toward the end of the vertical axis V and those running toward the end of the diagonal axis. Therefore, the under-convergence effect made on the pair of side beams 3B and 3R by the four-pole magnetic field generated by the orbital correction coil unit 14 is substantially equal between the three electron beams running toward the end of the vertical axis V and those running toward the end of the diagonal axis (where the arrow 33a indicates the direction of the magnetic field and the arrow 34a indicates the direction of the force which the electron beams receive).

As shown in FIG. 10B, in the phosphor-screen-side portion of the panel-side orbital correction coil unit 14, the side beams 3B and 3R pass through a substantially horizontal magnetic field and do not substantially receive an under-convergence effect. However, since the side beams 3B and 3R running toward the end of the diagonal axis pass through the magnetic field indicated by the arrow 33b, these beams receive relatively an effect in the under-convergence direction by the vertical component of the magnetic field (indicated by the arrow of a broken line).

That is, the panel-side orbital correction coil unit 14 generates a magnetic field having such a distribution which makes the under-convergence effect greater with respect to the three electron beams 3B, 3G, and 3R running toward the end of the diagonal axis of the phosphor screen 12 than with respect to the three electron beams 3B, 3G, and 3R running toward the end of the vertical axis, so that the convergences of the electron beams are excellent at the ends of the vertical axis and the diagonal axis of the phosphor screen.

Figure 11:
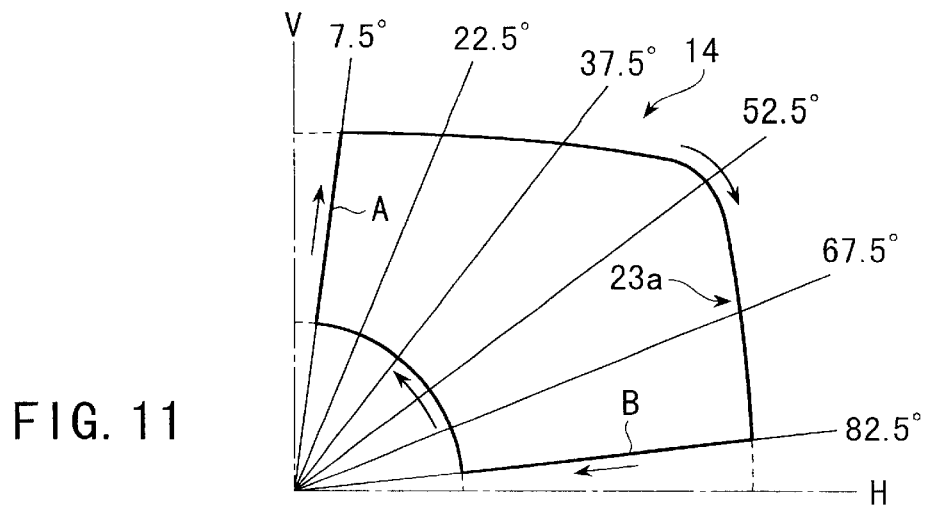
FIG. 11 is a view showing a layout example where coil wires of the orbital correction coil of the panel-side orbital correction coil unit are arranged close to the vertical axis.
Figure 12:
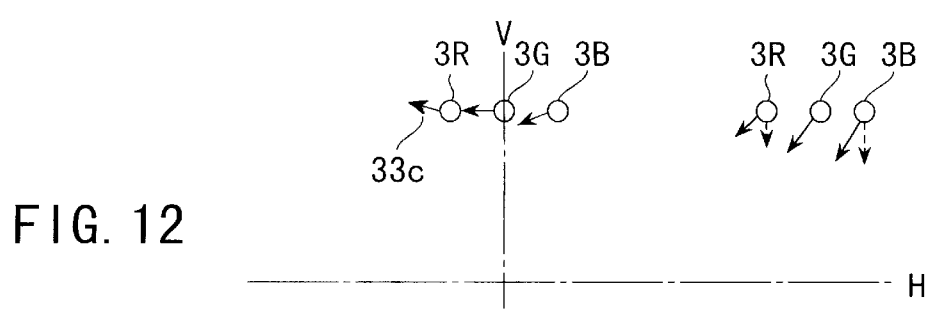
FIG. 12 is a view showing an effect of the magnetic field generated at the phosphor-screen-side portion of the panel-side orbital correction coil unit where the orbital correction coil is arranged as shown in FIG. 11.

In this case, as shown in FIG. 11, when the coil wires A in the vertical axis V side are set closer to the vertical axis (e.g., the position is set closer to 7.5° from 22.5° shown in FIG. 8), the magnetic field through which the three electron beams 3B, 3G, and 3R run toward the ends of the vertical axis V and the diagonal axis is as shown in FIG. 12. That is, at the phosphor-screen-side portion of the panel-side orbital correction coil unit 14, the side beams 3B and 3R running toward the end of the vertical axis V of the phosphor screen 12 pass through a magnetic field which is somewhat inclined as indicated by the arrow 33c, and receive an under-convergence effect by the vertical component of this magnetic field. Further, the side beams 3B and 3R running toward the end of the diagonal axis receive a relative under-convergence effect due to the difference between the vertical components of the magnetic field which are effected on the red beam 3R and the blue beam 3B.

That is, in case where the three electron beams 3B, 3G, and 3R are matched at the end of the vertical axis V of the phosphor screen 12, the magnetic field distribution cannot sufficiently correct the convergences of the side beams 3B and 3R.

Figure 13:
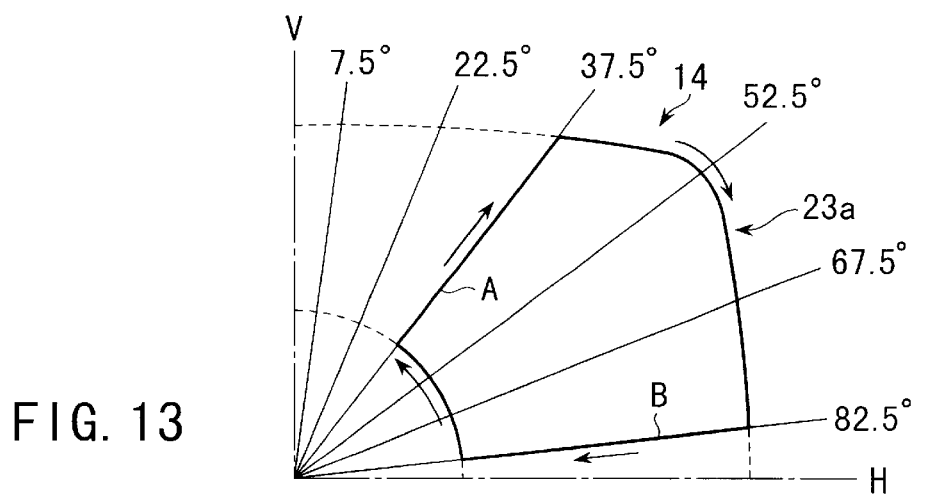
FIG. 13 is a view showing a layout example wherein the coil wires of the orbital correction coil of the panel-side orbital correction coil unit are arranged apart from the vertical axis.
Figure 14:
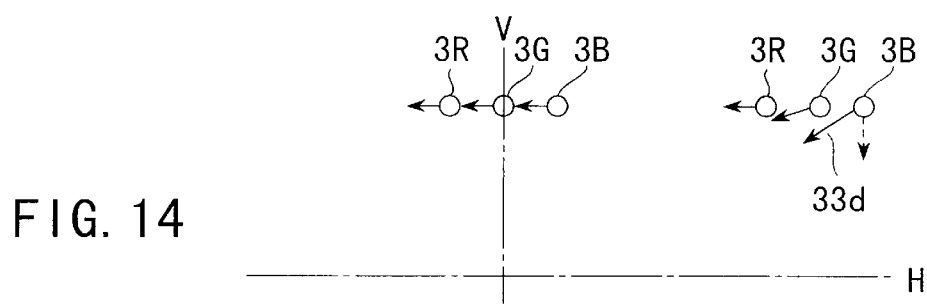
FIG. 14 is a view showing an effect of the magnetic field generated at the phosphor-screen-side portion of the panel-side orbital correction coil unit where the orbital correction coil is arranged as shown in FIG. 13.

Inversely, as shown in FIG. 13, if the vertical-axis-V-side coil wires A of the orbital correction coil 23a are set farer from the vertical axis (e.g., the position is set to 37.5° in relation to 22.5° shown in FIG. 8), the magnetic field through which the three electron beams 3B, 3G, and 3R run toward the ends of the vertical axis V and the diagonal axis is as shown in FIG. 14. That is, at the phosphor-screen-side portion of the panel-side orbital correction coil unit 14, the side beams 3B and 3R running toward the end of the vertical axis V of the phosphor screen 12 pass through a horizontal magnetic field and therefore receive no under-convergence effect. Meanwhile, the side beams 3B and 3R running toward the end of the diagonal axis pass through the magnetic field indicated by the arrow 33d, and therefore, the under-convergence effect becomes too large. At the same time, the difference between the horizontal components of the magnetic field which are respectively effected on the red beam 3R and the blue beam 3B become large so that the convergences in the vertical direction is deteriorated at the end of the diagonal axis of the phosphor screen.

Specifically, in case where the three electron beams 3B, 3G, and 3R are matched at the end of the vertical axis V of the phosphor screen 12, the magnetic field distribution deteriorates the vertical and horizontal convergences of the side beams 3B and 3R at the end of the diagonal axis.

Hence, in the color cathode ray tube apparatus according to the present embodiment, a neck-side orbital correction coil unit 13 and a panel-side orbital correction coil unit 14 are provided. In particular, the panel-side orbital correction coil unit 14 is constructed by looped four-pole magnetic field generation coils 23a, 23b, 23c, and 23d arranged inside the magnetic core of the deflection yoke 40. Further, the angle between the vertical axis V and the coil wires A of each coil on the side of the vertical axis is set within a range of 10 to 30° on the cross-section of each coil, which is perpendicular to the tube axis and close to the phosphor screen, and the current flows through these coil wires A in the direction from the neck side toward the panel. Also, the angle between the vertical axis V and the other coil wires B on the side of the horizontal axis H is set within a range of 60 to 90°, and the current flows through these coil wires B in the direction from the panel side toward the neck. As a result of this, as shown in FIG. 5, the orbits of the three electron beams are corrected by the operations of the neck-side and panel-side orbital correction coil units 13 and 14, and the virtual Sg is reduced in the vertical direction of the phosphor screen 12 thereby to increase q, so that the convergences of the three electron beams can be improved to be excellent over the entire phosphor screen.

Therefore, according to the present embodiment, the convergence characteristics of the three electron beams can be improved over the entire phosphor screen even if the cathode ray tube apparatus is constructed so as to realize a flat screen by providing two orbital correction coil units and by using a shadow mask having a large curvature in relation to a flat panel.

Note that the same advantages as described above can be attained even when the neck-side orbital correction coil unit is constructed by using a component member such as electrodes of the electron gun 41 and the like and the panel-side orbital correction coil unit is constructed as described above such that an over-convergence effect is attained in the direction of the vertical axis V of the phosphor screen 12. This is because the layout position of the neck-side orbital correction coil unit is substantially equal in both of the cases where the neck-side orbital correction coil unit is constructed by coils and where it is constructed by components of the electron gun.

In the following, examples of the color cathode ray tube apparatus will be explained.

EXAMPLE 1

In the color cathode ray tube apparatus according to the example 1, the diagonal effective diameter of the phosphor screen 12 is about 460 mm, the deflection angle is 90°, and the outer diameter of the neck 38 is 29.1 mm. Also, the small diameter portion 39 of the funnel where a deflection yoke 40 is installed is formed in a substantially pyramidal shape, and the cross-section thereof perpendicular to the tube axis Z is formed in a substantially rectangular shape. The deflection yoke 40 is formed to have a substantially rectangular cross-section in accordance with the cross-sectional shape of the small diameter portion 39.

The orbital correction coils 22a and 22b of the neck-side orbital correction coil unit 13 are wound so as to generate a four-pole magnetic field, thereby to over-converge the side beams 3B and 3R deflected in the vertical direction. Meanwhile, the orbital correction coils 23a, 23b, 23c, and 23d of the panel-side orbital correction coil unit 14 are wound like a loop, respectively, so as to generate a four-pole magnetic field in a direction opposite to the direction of the magnetic filed generated by the coil unit 13, thereby to under-converge the side beams 3B and 3R deflected in the vertical direction of the screen 12.

More specifically, each of the two orbital correction coils 22a and 22b of the neck-side orbital correction coil unit 13 is wound 100 times around a magnetic core of a coma-free coil made of a silicon steel plate which is 1.5 mm thick. Each of the four orbital correction coils 23a, 23b, 23c, and 23d of the panel-side orbital correction coil unit 14 is wound 23 times. Each of the orbital correction coils 23a, 23b, 23c, and 23d is arranged such that the angle between the vertical axis V and its coil wires A on the side of the vertical axis V is 22.5° and the angle between the vertical axis and the other coil wires B on the side of the horizontal axis H is 82.5°, as in the case shown in FIG. 8.

Figure 15:
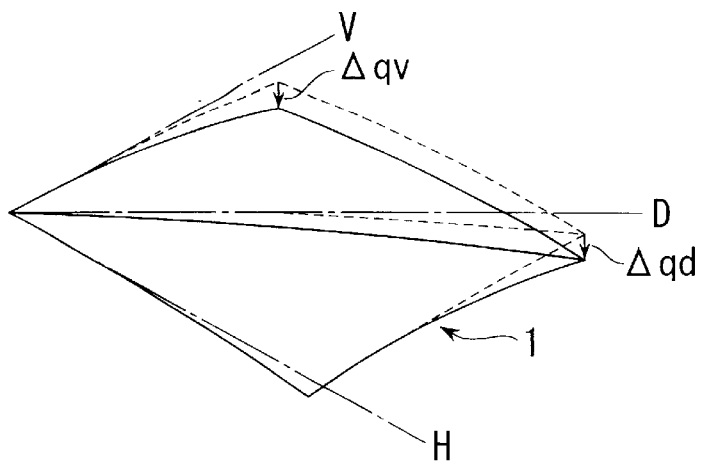
FIG. 15 is a view schematically showing the shape of the curved surface of a shadow mask in a color cathode ray tube apparatus according to the example 1 of the present invention.

According to the color cathode ray tube apparatus constructed as described above, the pair of side beams are changed in the in-line direction of the three electron beams so that the virtual Sg is reduced in the vertical direction of the phosphor screen 12, as shown in FIG. 5. As a result of this, the fall Δqv of the shadow mask 1 at the end of the vertical axis in the tube axis direction in relation to the center of the shadow mask 1, and the fall Δqd of the shadow mask at the end of the diagonal axis in the tube axis direction could be each increased by about 5 mm, as shown in FIG. 15. That is, the curvature of the shadow mask 1 in the vertical direction could be increased, so that a sufficient tension strength can be attained.

In addition, the convergences of the three electron beams 3B, 3G, and 3R could be matched over the entire phosphor screen 12. The convergence error of the pair of side beams 3B and 3R in the beam in-line direction at the vertical axis end of the phosphor screen, which had been a particular problem, could be reduced to 0.09 mm, and the convergence error of the pair of side beams 3B and 3R at the diagonal axis end could be reduced to −0.46 mm and −0.40 mm in the in-line direction of the three electron beams and in the direction perpendicular to the in-line direction, respectively.

EXAMPLE 2

In the example 2, each of the two orbital correction coils 22a and 22b of the neck-side orbital correction coil unit 13 is wound 50 times, and each of the four orbital correction coils 23a, 23b, 23c, and 23d of the panel-side orbital correction coil unit 14 is wound 11 times. Each of orbital correction coils 23a, 23b, 23c, and 23d is arranged such that the angle between the vertical axis V and its coil wires A on the side of the vertical axis V is 22.5° and the angle between the vertical axis and the other coil wires B on the side of the horizontal axis H is 82.5°, like in FIG. 8. In this case, Δqv and Δqd could be each increased by about 2 mm. Also, in this case, the convergence error of the pair of side beams 3B and 3R in the beam in-line direction at the vertical axis end of the phosphor screen could be reduced to −0.07 mm, and the convergence error of the pair of side beams 3B and 3R at the diagonal axis end could be reduced to −0.65 mm and −1.27 mm in the beam in-line direction of the three electron beams and in the direction perpendicular to the in-line direction, respectively.

Further, in the color cathode ray tube apparatuses according to the above two examples, the convergence error of the electron beams at the diagonal axis end could be reduced to ±0.2 mm or less which is equal to the level of a conventional cathode ray tube, by slightly adjusting the wind distributions of the horizontal and vertical coils of the deflection yoke.

EXAMPLE 3

In this color cathode ray tube apparatus, the diagonal effective diameter of the phosphor screen is about 410 mm, the deflection angle is 100°, and the outer diameter of the neck 38 is 22.5 mm. Also, the small diameter portion of the funnel where a deflection yoke is installed is formed to have a substantially circular cross-section perpendicular to the tube axis, and the deflection yoke has a cross-sectional shape corresponding thereto.

Figure 16:
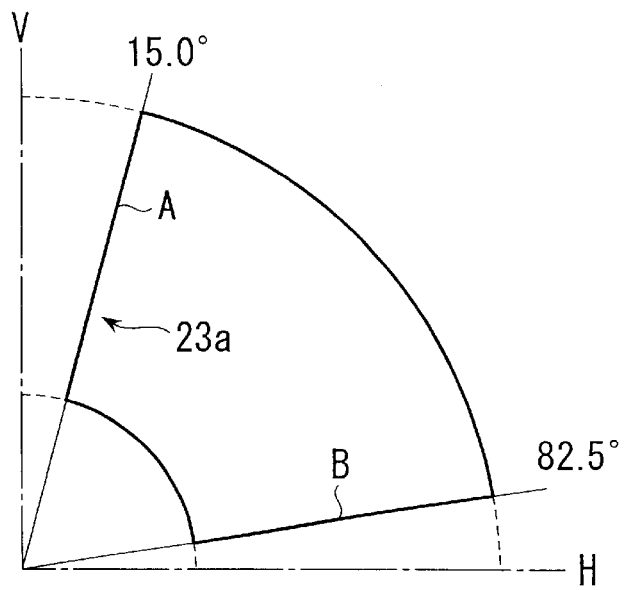
FIG. 16 is a view showing the shape of a looped coil of a panel-side orbital correction coil unit in a color cathode ray tube apparatus according to the example 3 of the present invention.
Figure 17:
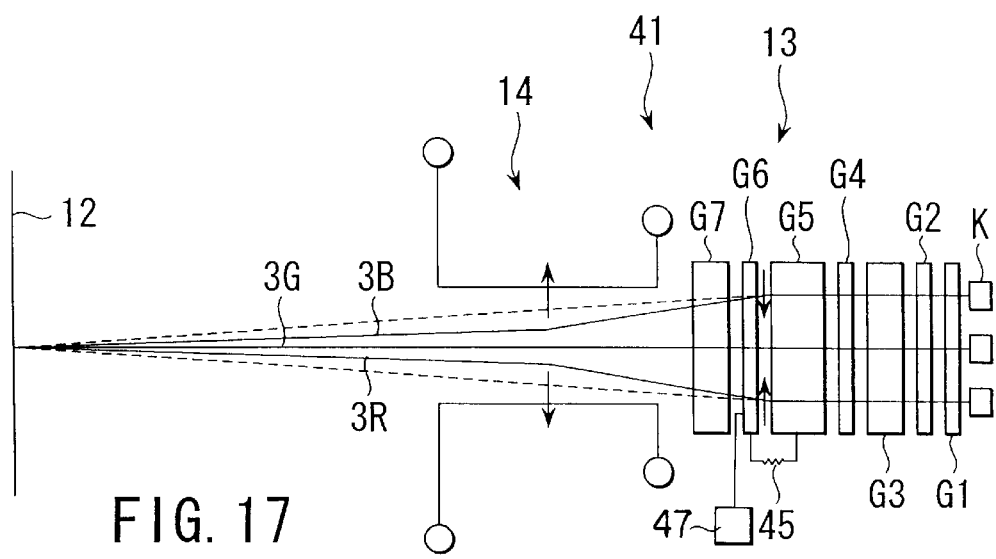
FIG. 17 is a view showing the structure of an electron gun and orbital correction coil units in a color cathode ray tube apparatus according to the example 4 of the present invention.

Also, in this color cathode ray tube apparatus, each of the two orbital correction coils 22a and 22b of the neck-side orbital correction coil unit 13 is wound 70 times around a magnetic core of a coma-free coil made of a silicon steel plate which is 1.5 mm thick. Each of the four looped orbital correction coils 23a, 23b, 23c, and 23d of the panel-side orbital correction coil unit 14 is wound 25 times. Further, as shown in FIG. 16, each of orbital correction coils 23a, 23b, 23c, and 23d is arranged such that the angle between the vertical axis V and its coil wires A on the side of the vertical axis is 15.0° and the angle between the vertical axis V and the other coil wires B on the side of the horizontal axis H is 82.5°.

According to the color cathode ray tube apparatus constructed in this way, the fall Δqv at the end of the vertical axis V in the tube axis direction in relation to the center of the shadow mask 1, and the fall Δqd at the end of the diagonal axis in the tube axis direction could be each increased by about 5.2 mm. Accordingly, the curvature of the shadow mask in the vertical direction could be increased, so a sufficient tension strength can be attained.

In addition, the convergences of the three electron beams could be matched over the entire phosphor screen 12. The convergence error of the pair of side beams in the in-line direction of the three electron beams at the vertical axis end of the phosphor screen, which had been a particular problem, could be reduced to −0.08 mm, and the convergence error of the pair of side beams at the diagonal axis end could be reduced to −0.65 mm and −1.27 mm in the in-line direction of the three electron beams and in the direction perpendicular to the in-line direction, respectively.

Further, the convergence error of the electron beams at the diagonal axis end could be improved easily by slightly adjusting the wind distributions of the horizontal and vertical coils of the deflection yoke.

EXAMPLE 4

In this color cathode ray tube apparatus, of the two orbital correction coil units, the orbital correction coil unit in the neck side is constructed by the electrodes of the electron gun 41. This electron gun 41 adopts a structure disclosed in U.S. Pat. No. 5,519,290 as a basic structure, and has a cathode K and first to seventh electrodes, or grids G1 to G7 disposed orderly from the side of the cathode K toward the phosphor screen 12.

The first grid G1 is connected to the earth, and the second grid G2 and the fourth grid G4 are connected to each other and applied with a constant voltage of about 600 V or so. The third grid G3 and the sixth grid G6 are also connected to each other and are applied with a dynamic focus voltage obtained by superimposing a voltage which is increased by abut 500 V at the peripheral portion of the phosphor screen, on a constant voltage of 6 to 8 kV. Further, the seventh grid G7 is applied with a voltage of about 26 kV. The fifth grid G5 is connected to the sixth grid G6 through a high resistance 45 and is applied with a substantially constant focus voltage from which the dynamically changing portion of the dynamic focus voltage applied by a voltage supply circuit 47 to the sixth grid G6 is excluded.

Further, in this electron gun 41, the side beams running toward the vertical axis ends of the phosphor screen are over-converged by the fifth grid G5 and the sixth grid G6. That is, in the fifth grid G5 and the sixth grid G6, the centers of paired side beam holes formed in the opposed surface of each grid are shifted in the in-line direction of the three electron beams. The orbits of the side beams 3B and 3R are corrected such that the side beams 3B and 3R come closer to the center beam 3G in the vertical axis direction of the phosphor screen 12, by the focus voltage which varies between the fifth grid G5 and the sixth grid G6 owing to the same effect as that obtained by the means indicated in U.S. Pat. No. 4,334,169.

Meanwhile, the orbital correction coil unit 14 on the panel side is constructed by four-pole magnetic field generation coils which are arranged inside the magnetic core of the deflection yoke and each wound a plurality of times like a loop, i.e., orbital correction coils, like in the previous examples. The angle between the vertical axis V and the coil wires A of each orbital correction coil on the side of the vertical axis V is 10 to 30°, and the angle between the vertical axis and the other coil wires B on the side of the horizontal axis H is 60 to 90°. The current flows through the coil wires A from the neck side toward the panel and through the coil wires B from the panel side toward the neck.

Even when the side beams are over-converged so as to correct their orbits by using a part of the electron gun 41, the convergences of the three electron beams can be improved to be excellent and the curvature of the shadow mask 1 in the vertical direction can be increased, so a sufficient tension strength can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color cathode ray tube apparatus comprising:

a vacuum envelope including a substantially rectangular panel having first and second axes which perpendicularly pass through a tube axis and are perpendicular to each other, a funnel connected to the panel, and a neck connected to an end of a small diameter portion of the funnel;

a phosphor screen formed on an inner surface of the panel, a mask for selecting colors, the mask having a surface which faces the phosphor screen with a predetermined distance, and a number of electron beam passage apertures formed in the surface;

an electron gun arranged in the neck, for emitting three electron beams toward the phosphor screen, the three electron beams including a center beam and a pair of side beams and being arranged in line with the first axis set as an in-line direction;

a deflection yoke installed on the small diameter portion of the funnel and the neck and having deflection coils for deflecting the three electron beams in directions of the first and second axes and a magnetic core provided outside the deflection coils;

neck side orbital correction means arranged between a cathode of the electron gull and the phosphor screen for relatively over-converging the pair of side beams when the side beams are running toward a peripheral portion of the phosphor screen compared with a time when the pair of side beams are running toward a center of the phosphor screen; and panel-side orbital correction means arranged between the neck-side orbital correction means and the phosphor screen, for relatively under-converging the pair of side beams when the side beams are running toward the peripheral portion of the phosphor screen compared with a time when the pair of side beams are running toward the center of the phosphor screen, wherein the panel-side orbital correction means includes looped orbital correction coils provided at four positions inside the magnetic core, each of the orbital correction coils being wound a plurality of times and a current supply circuit for supplying the orbital correction coils with a current which is supplied to the deflection coils for deflecting the three electron beams in the direction of the second axis, and in a cross section perpendicular to the tube axis at a position near the phosphor screen, each of the orbital correction coils at the panel-side orbital correction means which is provided between the first and second axes, includes first coil wires which have an angle of 10 to 30° with respect to the second axis and through which a current flows in a direction form a side of the neck toward the panel and second coil wires which have an angle of 60 to 90° with respect to the second axis and through which a current flows in direction from a side of the panel toward the neck.

2. An apparatus according to claim 1, wherein the neck-side orbital correction means includes coils provided on the neck side of the deflection yoke, and a current supply circuit for supplying the coils with a current synchronized with a line deflection frequency.

3. An apparatus according to claim 1, wherein the neck-side orbital correction means includes component members forming a part of the electron gun, and a voltage supply circuit for supplying the component members with a voltage.

4. An apparatus according to claim 1, wherein the panel has a substantially flat outer surface.

5. A color cathode ray tube apparatus comprising:

a vacuum envelope including a substantially rectangular panel having first and second axes which perpendicularly pass through a tube axis and are perpendicular to each other a funnel connected to the panel and a neck connected to an end of a small diameter portion of the funnel.

a phosphor screen formed on an inner surface of the panel;

a mask for selecting colors, the mask having a surface which faces the phosphor screen with a predetermined distance and a number of electron beam passage apertures formed in the surface an electron gun arranged in the neck for emitting three electron beams toward the phosphor screen, the three electron beams including a center beam and a pair of side beams and being arranged in line with the first axis set as an in-line direction;

a deflection yoke installed on the small diameter portion of the funnel and the neck and having deflection coils for deflecting the three electron beams in directions of the first and second axes and a magnetic core provided outside the deflection coils;

neck-side orbital correction means arranged between a cathode of the electron gun and the phosphor screen, for relatively over-converging the pair of side beams when the side beams are running toward a peripheral portion of the phosphor screen compared with a time when the pair of side beams are running toward a center of the phosphor screen; and panel-side orbital correction means arranged between the neck-side orbital correction means and the phosphor screen, for relatively under-converging the pair of side beams when the side beams are running toward the peripheral portion of the phosphor screen compared with a time when the pair of side beams are running toward the center of the phosphor screen such that a convergence error amount of the three electron beams on the phosphor screen caused by the neck-side orbital correction means is reduced to 15 mm or less, wherein the deflection coils have a wind distribution adjusted to as to compensate for a remaining portion of the convergence error amount.

* * * * *